US012715052B2

(12) United States Patent
Halasur et al.

(10) Patent No.: US 12,715,052 B2
(45) Date of Patent: Aug. 25, 2026

(54) CUTTING INSERT WITH SEATING SURFACE AND LIP SUPPORT

(71) Applicant: Kennametal Inc., Latrobe, PA (US)

(72) Inventors: Ravi Halasur, Shakunavalli (IN); Horst Jäger, Nuremberg (DE); Poornachander Shanthamraju, Hyderabad (IN); Mahesh Todkar, Bangalore (IN)

(73) Assignee: KENNAMETAL INC., Latrobe, PA (US)

( * ) Notice: Subject to any disclaimer, the term of this patent is extended or adjusted under 35 U.S.C. 154(b) by 212 days.

(21) Appl. No.: 18/118,638

(22) Filed: Mar. 7, 2023

(65) Prior Publication Data

US 2023/0286064 A1 Sep. 14, 2023

(30) Foreign Application Priority Data

Mar. 8, 2022 (IN) ............................ 202241012606

(51) Int. Cl.
*B23B 51/02* (2006.01)
*B23B 51/00* (2006.01)

(52) U.S. Cl.
CPC ................................ *B23B 51/0008* (2022.01)

(58) Field of Classification Search
CPC ........ B23B 2200/126; B23B 2200/125; B23B 2200/12; B23B 2200/204; B23B 2200/3609; B23B 2205/12; B23B 2251/50; B23B 51/0008; B23B 51/0007; B23B 51/0006
See application file for complete search history.

(56) References Cited

U.S. PATENT DOCUMENTS

| | | | | |
|---|---|---|---|---|
| 2009/0071723 | A1* | 3/2009 | Mergenthaler | B23B 27/141 175/394 |
| 2009/0238649 | A1* | 9/2009 | Kruszynski | B23B 27/141 407/62 |
| 2014/0161552 | A1 | 6/2014 | Ramesh | |

FOREIGN PATENT DOCUMENTS

| | | | |
|---|---|---|---|
| CN | 1147779 | A | 4/1997 |
| CN | 1655900 | A | 8/2005 |
| CN | 101549413 | A | 10/2009 |
| CN | 102886551 | A | 1/2013 |
| CN | 103447591 | A | 12/2013 |
| CN | 103702789 | A | 4/2014 |
| CN | 105209198 | A | 12/2015 |
| CN | 107107208 | A | 8/2017 |

(Continued)

OTHER PUBLICATIONS

Extended European Search Report for European Application No. 241933522, mailed Nov. 22, 2024, 9 Pages.

(Continued)

*Primary Examiner* — Alan Snyder
(74) *Attorney, Agent, or Firm* — Christopher J. Owens

(57) ABSTRACT

The present invention provides a cutting insert with a lip support providing additional support for the cutting insert. The cutting insert may be secured to a pocket of a drilling tool. The cutting insert may include a front surface, rear surface, and side surfaces. Cutting edges may form at the intersection of the side surfaces and the front surface. A cutting lip may extend rearwardly from the cutting edges with a seating surface under the cutting lip. The transition between the seating surface and the cutting lip may include two chamfers separated by a lip support.

20 Claims, 9 Drawing Sheets

(56) References Cited

FOREIGN PATENT DOCUMENTS

| | | | |
|---|---|---|---|
| CN | 107249796 | A | 10/2017 |
| DE | 102015213016 | A1 | 1/2016 |
| JP | 2005169590 | A | 6/2005 |
| JP | 2015024479 | A | 2/2015 |
| KR | 20190021592 | A | 3/2019 |
| WO | 2014192798 | A1 | 12/2014 |

OTHER PUBLICATIONS

Jun. 14, 2024 Foreign Office Action Chinese Application No. CN202010484243.2, 15 Pages.

Jun. 21, 2024 Foreign Office Action Chinese Application No. CN202010709204.8, 08 Pages.

Sep. 21, 2023 Foreign Office Action Indian Application No. IN201941023475, 6 Pages.

Apr. 5, 2024 Foreign Office Action European Application No. EP20200189283, 7 pages.

Jun. 7, 2024 Foreign Office Action Chinese Application No. CN202010484269.7, 5 pages.

Jun. 25, 2024 Foreign Office Action Chinese Application No. CN202210790681, 02 pages.

Jul. 1, 2024 Foreign Office Action Chinese Application No. CN201811588752.9, 20 pages.

Nov. 22, 2024 Foreign Office Action Chinese Application No. CN202310183925, 2 Pages.

Jan. 8, 2025 Foreign Office Action Chinese Application No. CN202010484243.2, 12 Pages.

Dec. 18, 2023 Foreign Office Action Chinese Application No. CN202010709204.8, 25 Pages.

Nov. 15, 2023 Notice of Allowance for U.S. Appl. No. 16/898,641, 4 Pages.

Aug. 31, 2024 Foreign Office Action Chinese Application No. CN202010484243.2, 12 Pages.

Sep. 2, 2024 Foreign Office Action Chinese Application No. CN202010484269, 07 Pages.

Sep. 13, 2024 Foreign Office Action Chinese Application No. CN202010709204, 07 Pages.

Mar. 18, 2024 Foreign Office Action Chinese Application No. CN201810208355.8, 8 Pages.

Dec. 13, 2023 Foreign Office Action Chinese Application No. CN202010484243, 21 Pages.

Dec. 14, 2023 Foreign Office Action Chinese Application No. CN202010484269, 22 Pages.

Jan. 4, 2024 Foreign Office Action Chinese Application No. CN201810208355, 28 Pages.

Oct. 20, 2023 Notice of Allowance for U.S. Appl. No. 16/898,641, 5 Pages.

Oct. 23, 2023 Foreign Office Action German Application No. DE102022119393, 6 Pages.

Nov. 3, 2023 Notice of Allowance for U.S. Appl. No. 16/898,641, 2 Pages.

Sep. 21, 2023 Final Office Action U.S. Appl. No. 16/898,641, 12 Pages.

* cited by examiner

CUTTING INSERT WITH SEATING SURFACE AND LIP SUPPORT

FIELD OF THE INVENTION

The present invention relates to cutting inserts, and more particularly relates to cutting inserts for use in drilling tools.

BACKGROUND INFORMATION

Various metal-cutting methods are known, including milling, drilling, turning, broaching, reaming and tapping. The cutting inserts, such as the cutting insert described in US Patent Application No. 2020/0391299, incorporated here by reference in its entirety, make contact with the pockets of the rotatable tool holder along seating surfaces of the cutting inserts. Increased sizes of the seating surfaces may reduce the risk of twisting of the cutting inserts in the pocket. However, increasing the size of the seating surface may also decrease the strength of the cutting edges of the cutting inserts. Therefore, there is a need in the art to provide a cutting insert with increased seating surface area while also having sufficient strength of the cutting edge.

SUMMARY OF THE INVENTION

The present invention provides a cutting insert with a lip support surface providing additional support for the cutting insert. The cutting insert may be secured to pocket of a drilling tool. The cutting insert may include a front surface, rear surface, and side surfaces. Cutting edges may form at the intersection of the side surfaces and the front surface. A cutting lip may extend rearwardly from the cutting edges with a seating surface under the cutting lip. The transition between the seating surface and the cutting lip may include two chamfers separated by the lip support surface.

An aspect of the present invention is to provide a cutting insert comprising a front surface centered around a longitudinal axis, a rear surface, and a plurality of side surfaces adjoining the front surface and the rear surface, wherein each side surface comprises a seating surface and a corner surface connecting the side surface to an adjacent side surface. A first cutting edge, a second cutting edge, and a third cutting edge may be at the intersection of each side surface and the top surface, wherein the second cutting edge comprises a convex curve and connects the first cutting edge to the third cutting edge. A cutting lip may extend rearwardly from the first cutting edge, second cutting edge, and third cutting edge, and raised from the seating surface and a transition between the seating surface and the cutting lip may comprise a lip support extending rearwardly from the cutting lip to the seating surface.

Another aspect of the present invention is to provide a drilling tool system comprising a drilling tool and a cutting insert, the cutting insert being secured into the drilling tool. The drilling tool may comprise a drilling body comprising a central longitudinal rotational axis, and an interior pocket in a front drilling face. The interior pocket may comprise a first sidewall portion extending forward from the pocket rear surface, a bottom seating surface, and a pocket rear surface comprising an upper portion above a lower portion, the upper portion being offset from the lower portion. The lower portion may comprise a rearwardly extending indent with an indent height being less than a lower portion height. The cutting insert may comprise a front surface centered around a longitudinal axis, a rear surface, and a plurality of side surfaces adjoining the front surface and the rear surface. Each side surface may comprise a seating surface and a corner surface connecting the side surface to an adjacent side surface, a first cutting edge, a second cutting edge, and a third cutting edge at the intersection of each side surface and the top surface. The second cutting edge may comprise a convex curve and connect the first cutting edge to the third cutting edge. A cutting lip may extend rearwardly from the first cutting edge, second cutting edge, and third cutting edge, and raised from the seating surface; and a transition between the seating surface and the cutting lip may comprise a lip support extending rearwardly from the cutting lip to the seating surface.

A further aspect of the present invention is to provide a drilling tool comprising a drilling body. The drilling body may comprise a central longitudinal rotational axis, and an interior pocket in a front drilling face. The interior pocket may comprise a first sidewall portion extending forward from the pocket rear surface, a bottom seating surface, and a pocket rear surface comprising an upper portion above a lower portion, the upper portion being offset from the lower portion. The lower portion may comprise a rearwardly extending indent with an indent height being less than a lower portion height.

These and other aspects of the present invention will be more apparent from the following descriptions.

DETAILED DESCRIPTION

Figure 1:
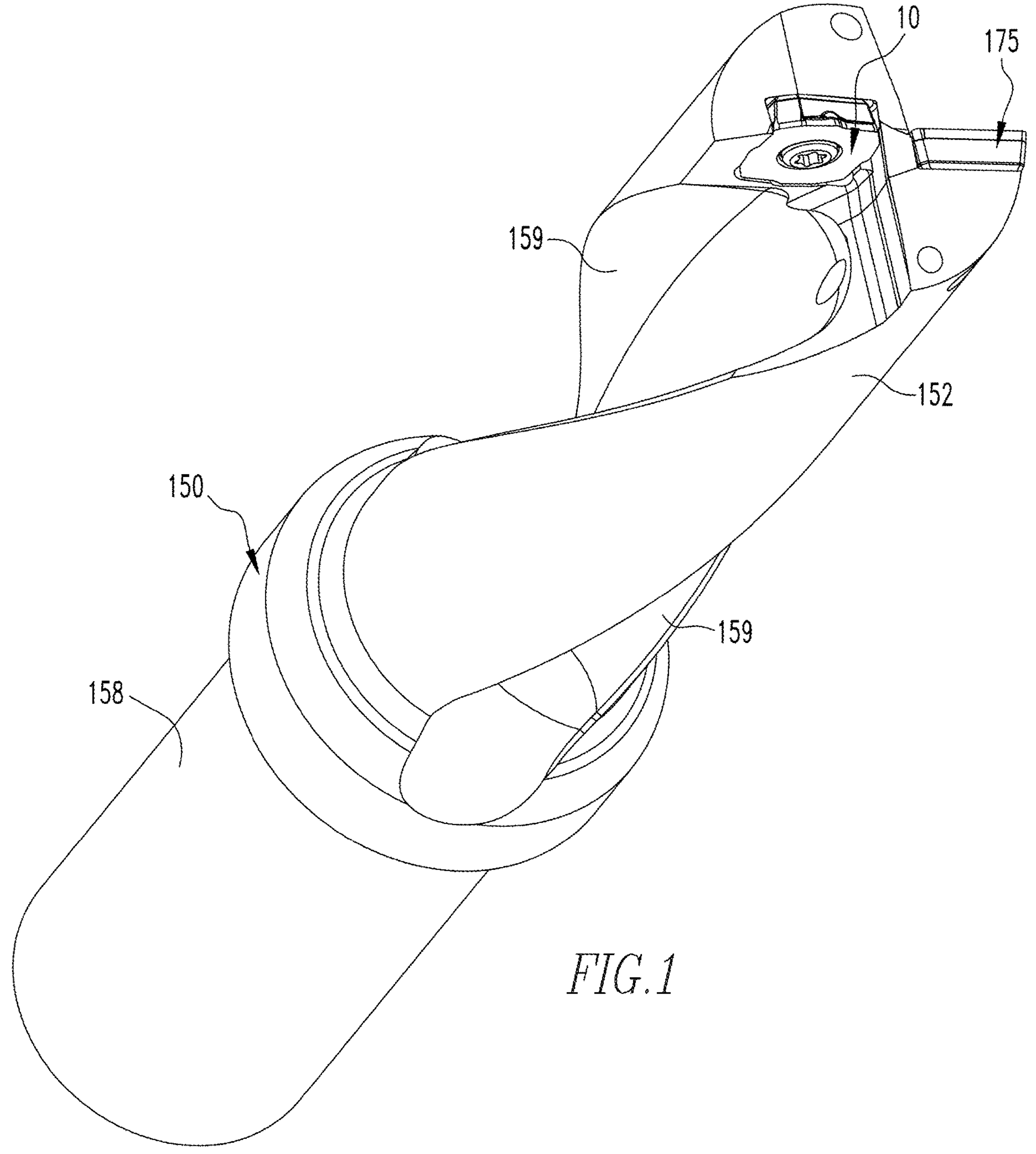
FIG. 1 is an isometric view of a drilling body with a drilling insert in accordance with an embodiment of the present invention.
Figure 2:
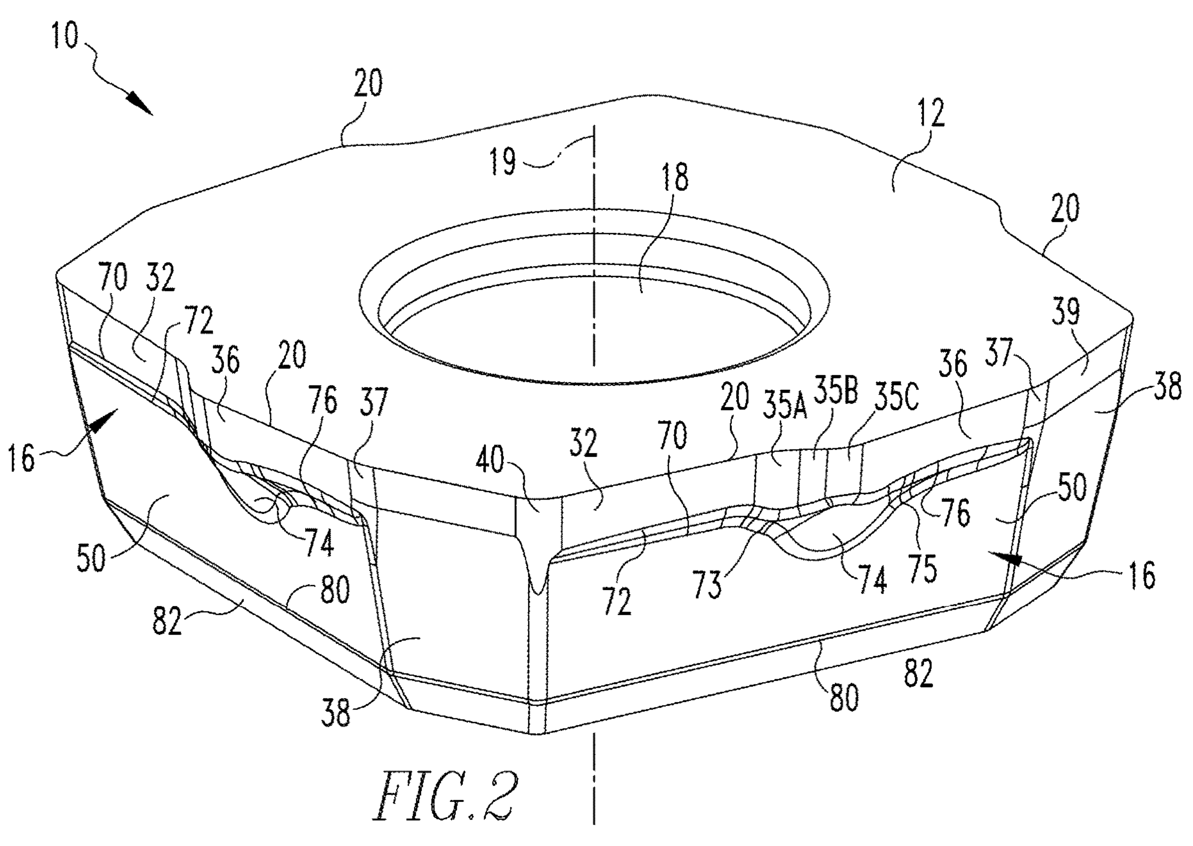
FIG. 2 is a top isometric view of the drilling insert of FIG. 1.
Figure 3:
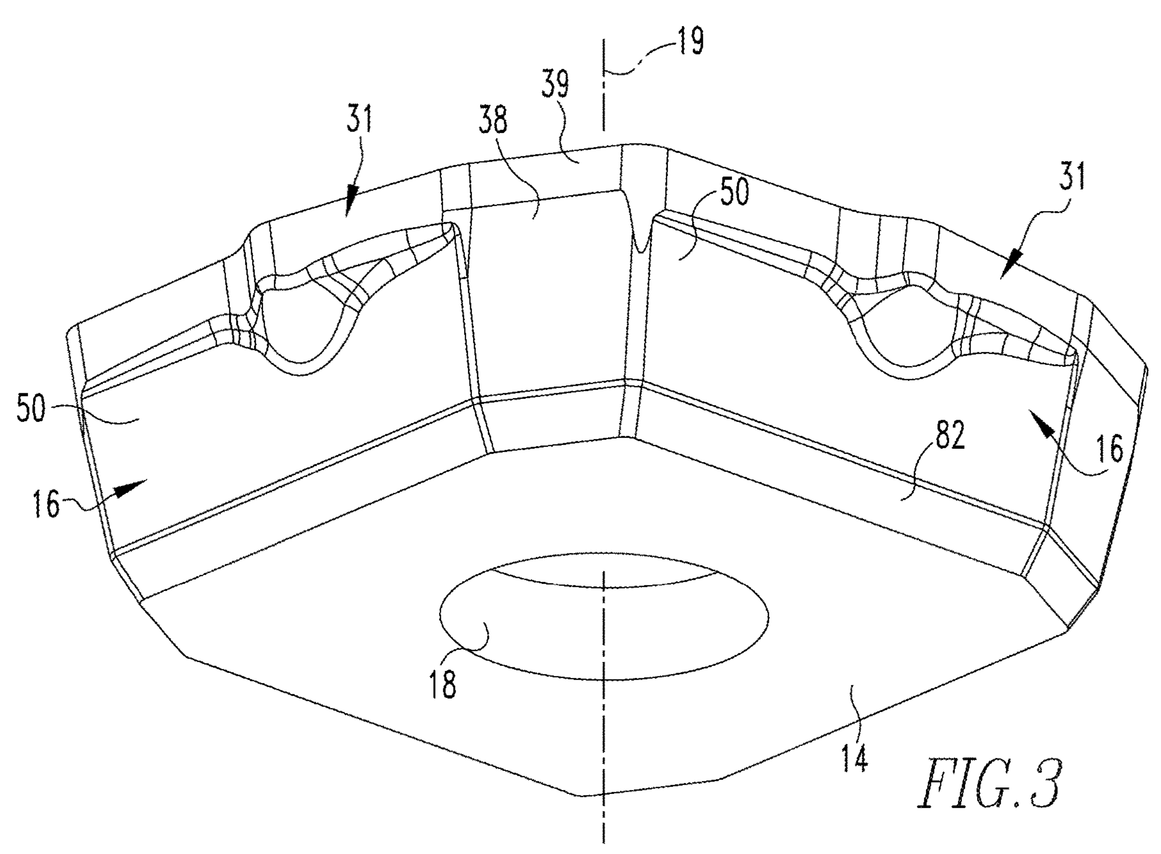
FIG. 3 is a bottom isometric view of the drilling insert of FIG. 1
Figures 4, 5:
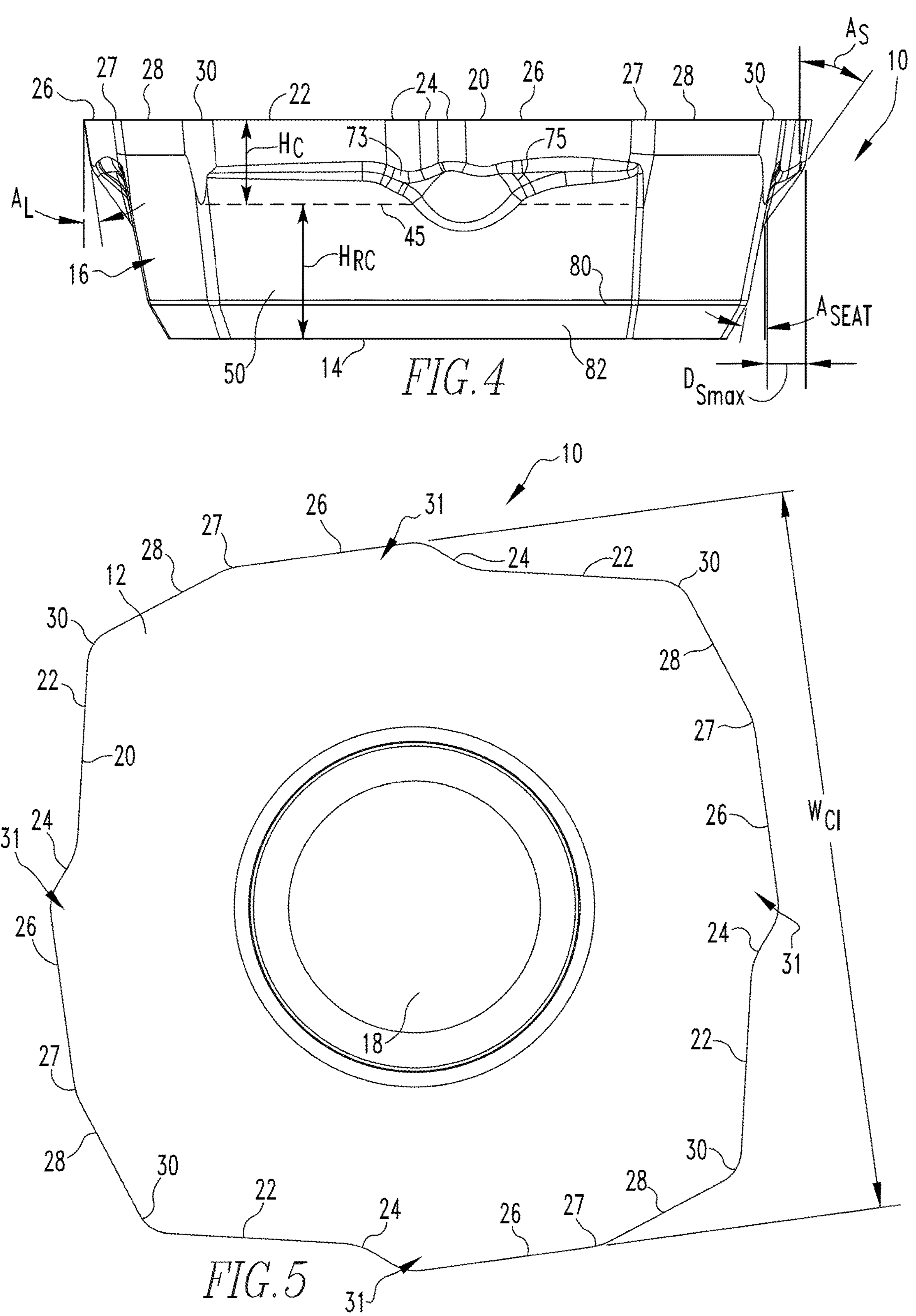
FIG. 4 is a side view of the drilling insert of FIG. 1.
FIG. 5 is a top view of the drilling insert of FIG. 1.
Figures 6, 7:
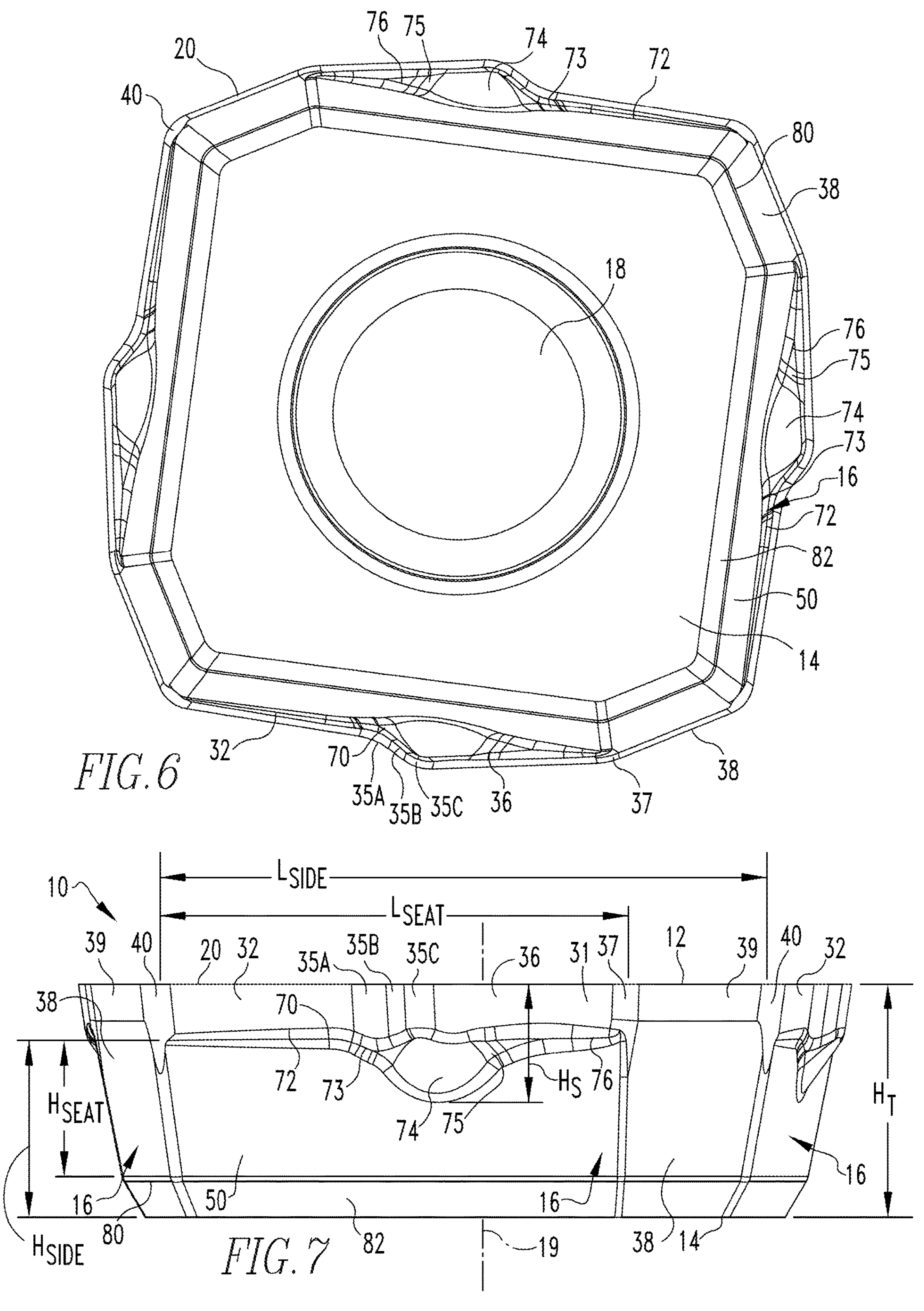
FIG. 6 is a bottom view of the drilling insert of FIG. 1.
FIG. 7 is an angled side view of the drilling insert of FIG. 1
Figure 8:
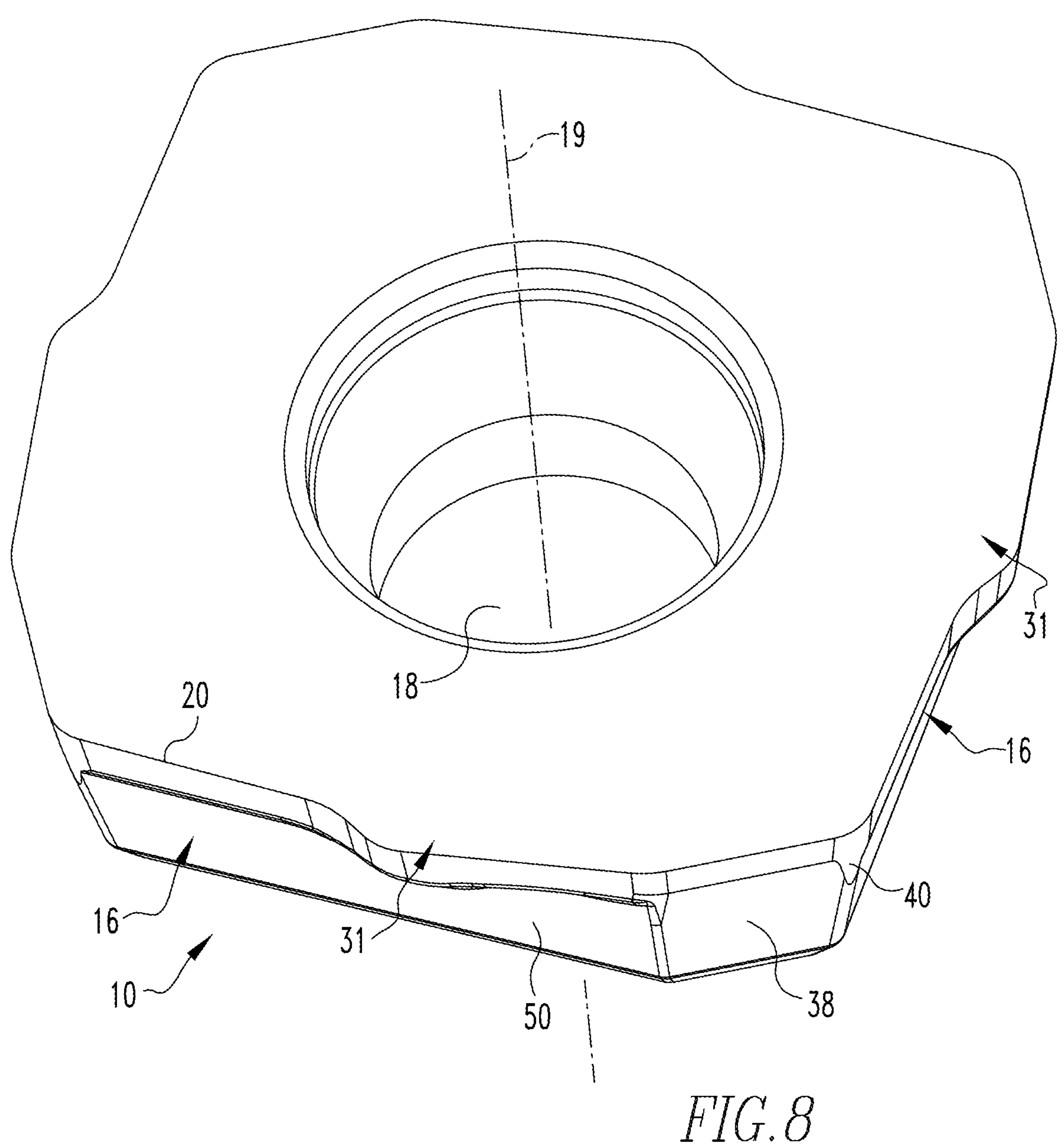
FIG. 8 is an angled top isometric view of the drilling insert of FIG. 1.
Figures 9, 10:
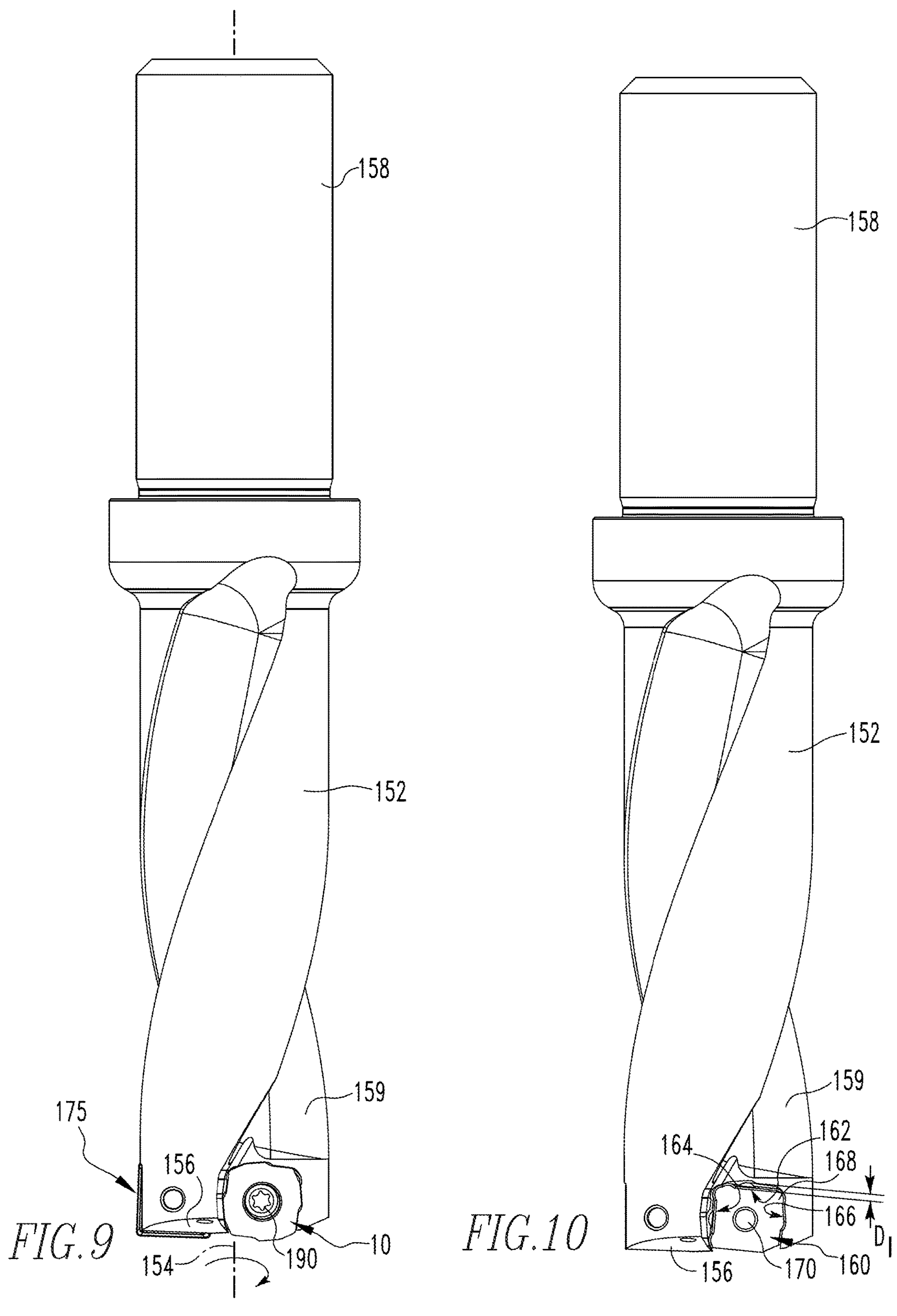
FIG. 9 is a side view of the drilling body with the drilling insert of FIG. 1.
FIG. 10 is a side view of the drilling body of FIG. 1 without a drilling insert.
Figure 11:
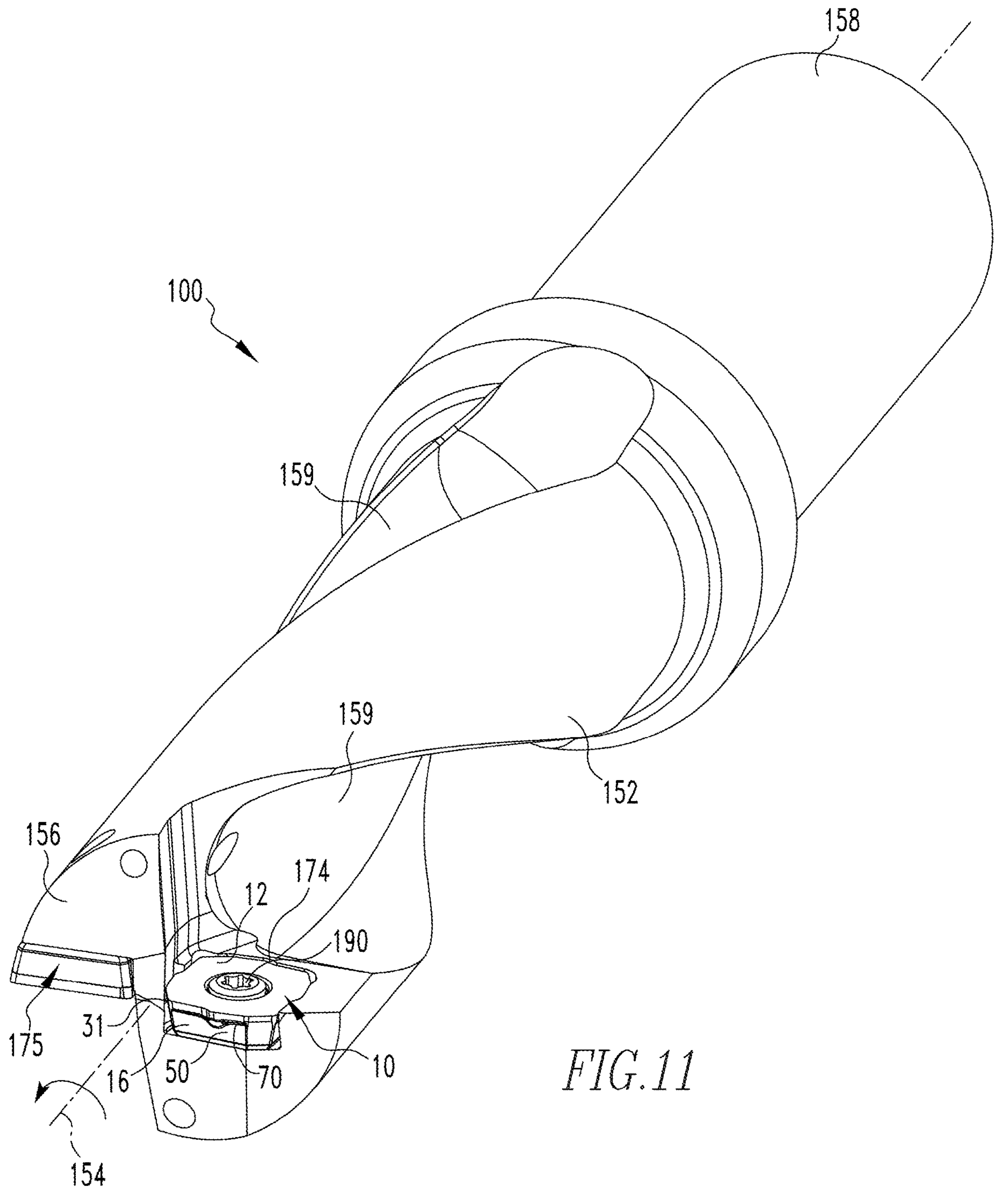
FIG. 11 is an isometric view of the drilling body with the drilling insert of FIG. 1 with a peripheral insert.
Figure 12:
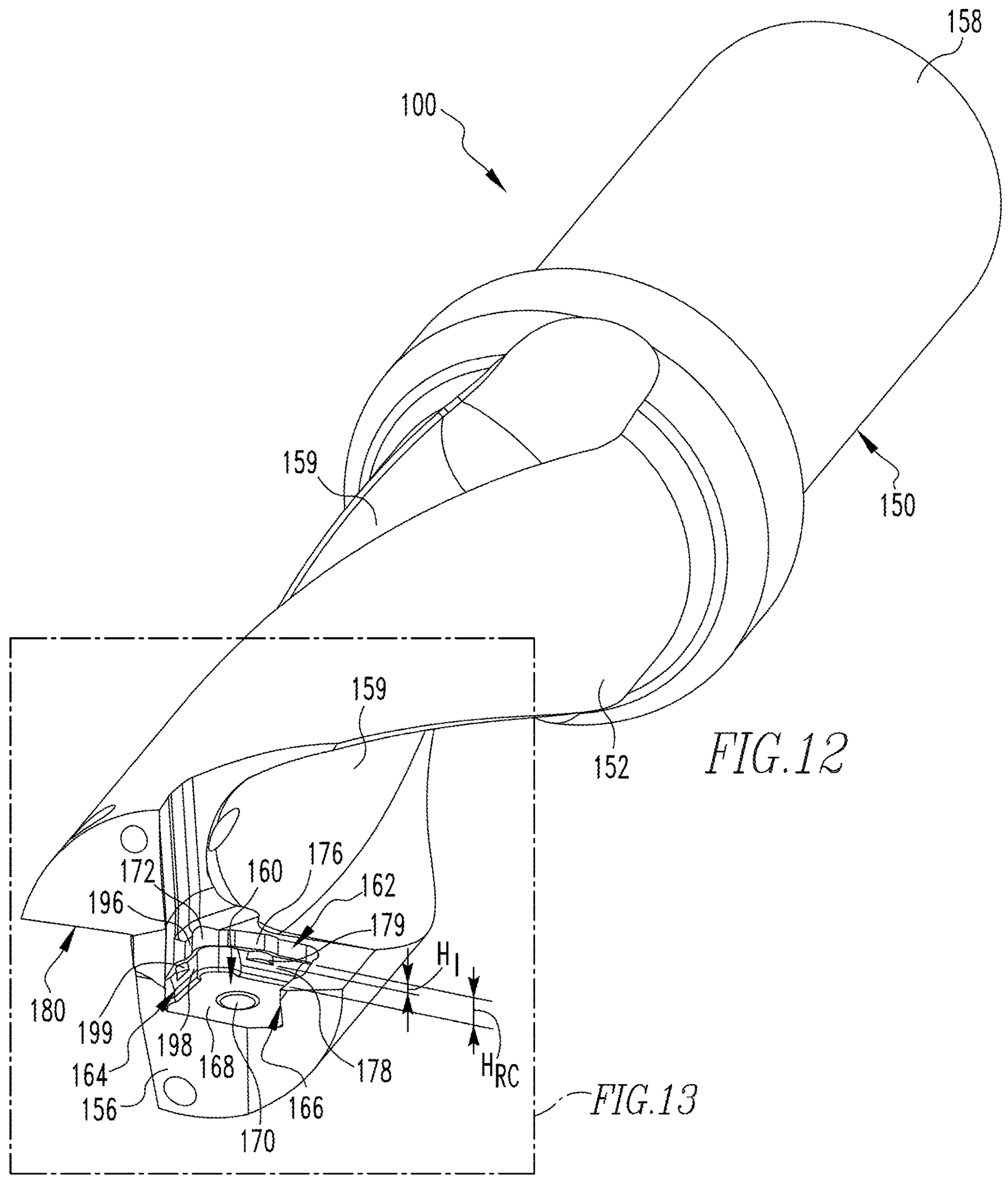
FIG. 12 is an isometric view of the drilling body of FIG. 1 without a peripheral insert or drilling insert.

The cutting insert of the present invention addresses the issues mentioned above by providing a cutting insert with a lip support extending from a transition between a cutting lip and the seating surface. The lip support provides additional structural support to the cutting lip while also allowing the seating surface to have a maximized contact area for stability.

FIGS. 2-8 illustrate a cutting insert 10 in accordance with an embodiment of the present invention. The cutting insert 10 includes a front face 12 and a rear face 14. Multiple side faces 16, e.g., four side faces 16, extend between the front face 12 and the rear face 14. The rear face 14 may have a smaller surface area that the front face 12. A central hole 18 is provided through the cutting insert from the front face 12 to the rear face 14. The central hole 18 defines a central longitudinal axis 19 of the cutting insert. In some non-limiting embodiments or aspects, the cutting insert has 90° rotational symmetry around the central longitudinal axis 19.

The cutting insert 10 includes multiple cutting edges 20, e.g., four cutting edges 20. A cutting edge 20 may be formed at the intersection of the side face 16 and the front face 12. The number of cutting edges 20 may equal the number of side faces 16. Each cutting edge 20 includes a first cutting edge segment 22, a second cutting edge segment 24, a third cutting edge segment 26, and a fourth cutting edge segment 28. The first cutting edge segment 22 may be substantially linear. The first cutting edge segment 22 may connect to the second cutting edge segment 24. The second cutting edge segment 24 may be a curved edge, e.g., a concave and/or convex edge, and/or a linear edge and may project outward of the side face 16. The second cutting edge segment 24 may connect to the third cutting edge segment 26. The third cutting edge segment 26 may be substantially linear. The third cutting edge segment 26 may connect to a fourth cutting edge segment 28 through a transitional cutting edge segment 27. The fourth cutting edge segment 28 may be substantially linear. The transitional cutting edge segment 27 may be a convex curve.

In some non-limiting embodiments or aspects, each side face 16 includes a cutting lip 31 extending from the cutting edge 20 rearwardly towards the rear surface 14. The cutting lip 31 may extend in a direction parallel to the longitudinal axis 19. The cutting lip 31 may extend in a direction that is angled inwardly. The lip angle $A_L$ may be at most 15° from being parallel with the longitudinal axis 19, for example at most 13° or 11°. The lip angle $A_L$ may be at least 5°, for example, at least 7° or 9°. The lip angle $A_L$ may range from 5° to 15°, for example, from 7° to 13° or from 9° to 11°.

The cutting lip 31 may include a first side surface 32, concave surface 35A, linear surface 35B, convex surface 35C, and third side surface 36. The first side surface 32 extends rearwardly from the first cutting edge segment 22 towards the rear face 14. The concave surface 35A forms a concave surface extending rearwardly from the second cutting edge segment 24 towards the rear face 14 connecting to the first side surface 32. The convex surface 35C forms a convex surface extending rearwardly from the second cutting edge segment 24 towards the rear face 14 and connecting to the third side surface 36. The concave surface 35A and convex surface 35C are connected by a linear surface 35B. The linear surface 35B extends rearwardly from the second cutting edge segment 24. The third side surface 36 extends rearwardly from the third cutting edge segment 26 towards the rear face 14.

The side face 16 may also include a fourth side surface 39 extending from the cutting edge 20 rearwardly towards the rear surface 14. The fourth side surface 39 may extend from the fourth cutting edge segment 28 of the cutting edge 20. The fourth cutting side surface 39 may be connected to the third side surface 36 through the transitional side surface 37. The transitional side surface 37 may extend from the transitional cutting edge segment 27 rearwardly towards the rear surface 14. The fourth side surface 39 and/or the transitional side surface 37 may initially extend rearwardly in a direction parallel to the longitudinal axis 19. The fourth side surface 39 and/or the transitional side surface 37 may extend in a direction angled inward towards the center of the cutting insert 10. The angle of the fourth side surface 39 and/or the transitional side surface 37 may be the same as the lip angle $A_L$. The fourth side surface 39 may then transition into a lower fourth side surface 38 that extends further rearwardly towards the rear surface 14. The lower fourth side surface 38 may be sloped at an angle further inward than the fourth side surface 39. The lower fourth side surface 38 may be angled at an angle equal to the seat angle $A_{Seat}$. The transitional side surface 37 may also slope further inward towards the center of the cutting insert 10 along the lower fourth side surface 38. The transitional surface 37*s* and the seating side surface may then transition into a slope that is even further inward after the bottom transition edge 80 in the rearwardly direction.

In some non-limiting embodiments or aspects, the cutting insert 10 may include corner edge portions 30 between adjacent cutting edges 20. As shown in FIGS. 2-8, each corner edge portion 30 may include a rounded segment structured and arranged to connect adjacent cutting edges 20. The corner edge portion 30 may connect a first cutting edge segment 22 of one cutting edge 20 to a fourth cutting edge segment 28 of a second cutting edge 20. A corner surface 40 may extend rearwardly from the corner edge portion 30 towards the rear face 14. The corner surface 40 may be structured and arranged to connect the first side surface 32 of one side face 16 with the fourth side surface 39 of an adjacent side face 16.

Each side face 16 may also include a seating surface 50. The seating surface 50 may be located between the front face 12 and the rear face 14 extending rearwardly from the first side surface 32, concave surface 35A, linear surface 35B, convex surface 35C, and third side surface 36, and/or any combination thereof, towards the rear face 14. The seating surface 50 may be offset from the cutting lip 31 such the cutting lip 31 overhangs the seating surface 50. The height of the side surface under the cutting lip $H_{Side}$ may be measured as the vertical distance between the first undercut 72 and the rear surface 14. The bottom transition edge 80 on the side face 16 is the transition point in which the angle of the side face 16 changes inwardly such that the bottom surface 82 between the bottom transition edge 80 and the rear face 14 is sloped towards the center of the cutting insert 10 at a greater angle than the seating surface angle $A_{Seat}$. The seating surface 50 may be a flat surface. The seating surface 50 may be sloped inwardly at a seat angle $A_{Seat}$ of at least 7° from parallel with the longitudinal axis 19, for example, at least 9° or at least 11°. The seating surface 50 may extend rearwardly at a seat angle $A_{Seat}$ of at most 15° from parallel with the longitudinal axis 19, for example, at most 13° or at most 11°. The seating surface may extend rearwardly at a seat angle $A_{Seat}$ ranging from 7° to 15° from being parallel with the longitudinal axis 19, for example, from 9° to 13°.

The side height $H_{Side}$ may be at least 70% of the total height $H_T$ of the cutting insert 10, for example, at least 75% or at least 80%. The total height $H_T$ may be measured as the distance between the front face 12 and the rear face 14. The side height $H_{Side}$ may be at most 85% of the total height $H_T$, for example, at most 80% or at most 70%. The side height $H_{Side}$ may be at least 65% of the total height $H_T$, for example, at least 75% or at least 85%. The side height $H_{Side}$ may range from 65% to 85% of the total height $H_T$, for example, from 68% to 82% or from 72% to 80%.

The height of the seating surface $H_{Seat}$ may be measured as the vertical distance between the first undercut 72 and the bottom transition edge 80. The seating height $H_{Seat}$ may be at least 0.2 mm less than the side height $H_{Side}$, for example at least 0.4 mm or 0.6 mm less than the side height $H_{Side}$ The seating height $H_{Seat}$ may be at most 1.2 mm less than the side height $H_{Side}$, for example, at most 0.8 mm or 0.6 mm less than the side height $H_{Side}$ The seating height $H_{Seat}$ may range from 0.2 to 1.2 mm less than the side height $H_{Side}$.

The seating surface 50 may extend along at least a portion of the length of the side face 16. The seating surface 50 may extend along a majority of the length of the side face 16. The side length $L_{Side}$ may be measured as the horizontal distance between the center of the corner surface 40 of a side face 16 and the center of the corner surface of an adjacent side face 16. The cutting insert width $W_{CI}$ may be measured as the distance from one third cutting edge segment 26 of one side face 16 to the third cutting segment 26 of the opposite side face 16. The side length $L_{Side}$ may be at least 55% of the cutting insert width $W_{CI}$, for example, at least 65% or at least 75%. The side length $L_{Side}$ may be at most 90% of the cutting insert width $W_{CI}$, for example, at most 80%, at most 70%, or at most 60%. The side length $L_{Side}$ may range from 55% to 90% of the cutting insert width Wo, for example, from 60% to 80% or from 65% to 70%.

The length $L_{Seat}$ of the seating surface 50 may be measured as the horizontal distance between the center of the corner surface 40 and the center of the transition surface 37 of the side face. The seating length $L_{Seat}$ may be the same horizontal length as the side length $L_{Side}$. The seating length $L_{Seat}$ may be at least 5% smaller than the side length $L_{Side}$, for example, at least 10% smaller than the side length $L_{Side}$. The seating length $L_{Seat}$ may be at most 30% smaller than the side length $L_{Side}$, for example, at most 20% or 15% smaller than the side length $L_{Side}$. The seating length $L_{Seat}$ may range from 0% to 30% smaller than the side length $L_{Side}$, for example, 5% to 20% smaller than the side length $L_{Side}$ or 10% to 15% smaller than the side length $L_{Side}$.

The seating surface 50 may be structured and arranged to engage with an insert pocket, such as an interior pocket 160 and/or a peripheral pocket 180 (as shown in FIGS. 9-13). As used herein, "engage," "engages," "engagement," and "engaging" mean two or more features interact with each other to restrict relative movement between the drilling insert 10 and the insert pocket.

A top transition edge 70 may connect the seating surface 50 to the cutting lip 31. The top transition edge 70 may transition the side face 16 inwardly from the cutting lip 31 to the seating surface 50. The top transition edge 70 may include a first undercut 72, a first chamfer 73, a lip support 74, a second chamfer 75, and a second undercut 76. The first undercut 72 may be located at least between the seating surface 50 and the first side surface 32 and is structured and arranged to provide a transition between the first side surface 32 and the seating surface 50. The first undercut 72 may be a rounded surface, such as a fillet, chamfer, concave surface, convex surface, and/or the like. The first undercut 72 connects to the first chamfer 73 and the first undercut 72 may be located between the first chamfer 73 and the corner surface 40. The first chamfer 73 may be a concave surface or flat surface that transitions the lip support 74 to the first undercut 72.

The second chamfer 75 may connect the lip support 74 to the second undercut 76. The second chamfer 75 may be a concave surface or a flat surface that transitions the lip support 74 to the second undercut 76. The second undercut 76 may be a rounded surface, such as a fillet, chamfer, concave surface, convex surface, and/or the like. The second undercut 76 may be located at least between the seating surface 50 and the third side surface 36 and is structured and arranged to provide a transition between the third side surface 36 and the seating surface 50.

The lip support 74 is located between the first chamfer 73 and the second chamfer 75. The lip support 74 provides structural support of the cutting lip 31. During operation of the cutting insert 10, the lip support 74 reduces the likelihood of the cutting lip 31 fracturing or being damaged due to stresses experienced during the drilling operations. The lip support 74 extends in a rearwardly direction from the concave surface 35A, linear surface 35B, convex surface 35C, and third side surface 36 towards the rear surface 14. The lip support 74 may be curved, angled, convex, concave, and/or the like. The outer surface of the lip support 74 may be defined by an exterior surface of a shape, such as an elliptical cylinder, a circular cylinder, a cylinder with an oval cross-section, a faceted prism, and/or the like. The outer surface of the lip support 74 may extend rearwardly at a support angle $A_S$. The support angle $A_S$ of the lip support 74 may be at least 25° from being parallel with the longitudinal axis 19, for example, at least 28°, at least 30°, or at least 34°. The support angle $A_S$ may be at most 45° from being parallel with the longitudinal axis 19, for example, at most 42°, at most 40°, or at most 37°. The support angle $A_S$ may range from 25° to 45° from being parallel with the longitudinal axis 19, for example, from 28° to 42°, from 30° to 40°, from 34° to 37°, or some other subrange of any of the previous ranges.

The shape defining the outer surface of the lip support 74 may be an elliptical cylinder shape having a major axis length $L_{Major}$ and a minor axis length $L_{Minor}$. The major axis length $L_{Major}$ may be equal to the minor axis length $L_{Minor}$, resulting in a circular cone. The minor axis length $L_{Minor}$ may range from 6% of the cutting insert width $W_{CI}$ to 12% of the cutting insert width $W_{CI}$, for example, from 7% of the cutting insert width $W_{CI}$ to 11% of the cutting insert width $W_{CI}$ or from 9% of the cutting insert width $W_{CI}$ to 10% of the cutting insert width $W_{CI}$. The major axis length $L_{Major}$ may range from 8% of the cutting insert width $W_{CI}$ to 14% of the cutting insert width $W_{CI}$, for example, from 9% of the cutting insert width $W_{CI}$ to 13% of the cutting insert width $W_{CI}$ or from 10% to 12% of the cutting insert width $W_{CI}$.

The lip support 74 may extend in a direction parallel to the longitudinal axis 19 rearwardly towards the rear surface 14 along the seating surface 50. In some non-limiting embodiments or aspects, the lip support 74 may extend in a direction along the seating surface 50 that is within ±15° from being parallel with the longitudinal axis 19, for example, within ±10° from being parallel, ±5° from being parallel, or ±1° from being parallel. In some non-limiting embodiments or aspects, the lip support 74 may extend in a direction perpendicular to the longitudinal axis 19 towards the corner surface 40 or the transitional side surface 37 along the seating surface 50.

The lip support 74 may be a raised surface on the seating surface 50 at a support depth $D_S$. The support depth $D_S$ may decrease rearwardly from the convex surface 35C until the lip support 74 becomes flush with the seating surface 50. The support depth $D_S$ may be greatest at the convex surface 35C. The support depth $D_S$ may decrease to 0 in the rearwardly direction. The maximum support depth $D_{S\text{-}Max}$ may be measured from the apex of the lip support 74 to a plane level with the seating surface 50. The maximum support depth $D_{S\text{-}Max}$ may be at most 5% of the cutting insert width $W_{CI}$, for example, at most 4% or at most 3%. The maximum support depth $D_{S\text{-}Max}$ may be at least 2% of the cutting insert width $W_{CI}$, for example, at least 3% or at least 4%. The maximum support depth $D_{S\text{-}Max}$ may range from 2% to 5% of the cutting insert width $W_{CI}$, for example, from 2.5% to 4.5% or from 3% to 3.5%.

The lip support 74 may have a support height $H_S$ extending from the cutting edge 20 rearwardly until the lip support 74 is flush with the seating surface 50. The support height $H_S$ may be at least 35% of the total height $H_T$, for example, at least 40% or at least 45% of the total height $H_T$. The support height $H_S$ may be at most 55% of the total height $H_T$, for example, at most 53% or at most 51% of the total height $H_T$. The support height $H_S$ may be in the range of 35% to 55% of the total height $H_T$, for example in the range of 40% to 53% or 45% to 51%.

The lip support 74 may be centered in a range of 60% to 80% of the seating length $L_{Seat}$ from the corner surface 40, for example, from 65% to 75%. The lip support 74 may be centered in a range of 2% to 8% of the total height $H_T$ from the first cutting edge segment 22 inwards towards the longitudinal axis 19, for example, from 2.5% to 5% of the total height $H_T$ or from 3% to 4% of the total height $H_T$.

The drilling insert 10 may be made of any suitable material, such as tool steels, cemented carbides, and super hard material, such as cubic boron nitride (CBN), polycrystalline cubic boron nitride (PCBN), polycrystalline diamonds (PCD), tungsten carbide (WC), cermet, ceramic, and/or the like. The drilling insert 10 of the present invention may be fabricated by any suitable technique, such as carbide powder pressing, grinding, or additive manufacturing to provide the plurality of cutting edge segments.

FIGS. 9-13 illustrate a drilling tool system 100 in accordance with an embodiment of the present invention. The drilling tool system 100 includes a drilling body 150, an inboard drilling insert 10, and a peripheral or outboard drilling insert 175. The drilling body 150 has a generally cylindrical body 152 with a central longitudinal axis 154. In non-limiting embodiments or aspects, the generally cylindrical body 152 of the drilling body 150 includes a front drilling face 156, a rear mounting end 158, and a plurality of helical flutes 159. The front drilling face 156 includes an interior pocket 160 structured and arranged to receive a central drilling insert 10 and a peripheral pocket 180 structured and arranged to receive a peripheral drilling insert 175. In the embodiment shown in FIG. 9-13, the generally cylindrical body 152 of the drilling body 150 includes two flutes 159, but any other suitable number of flutes 159 may be used. For example, there may be one, three, four, five, or more flutes 159.

Figure 13:
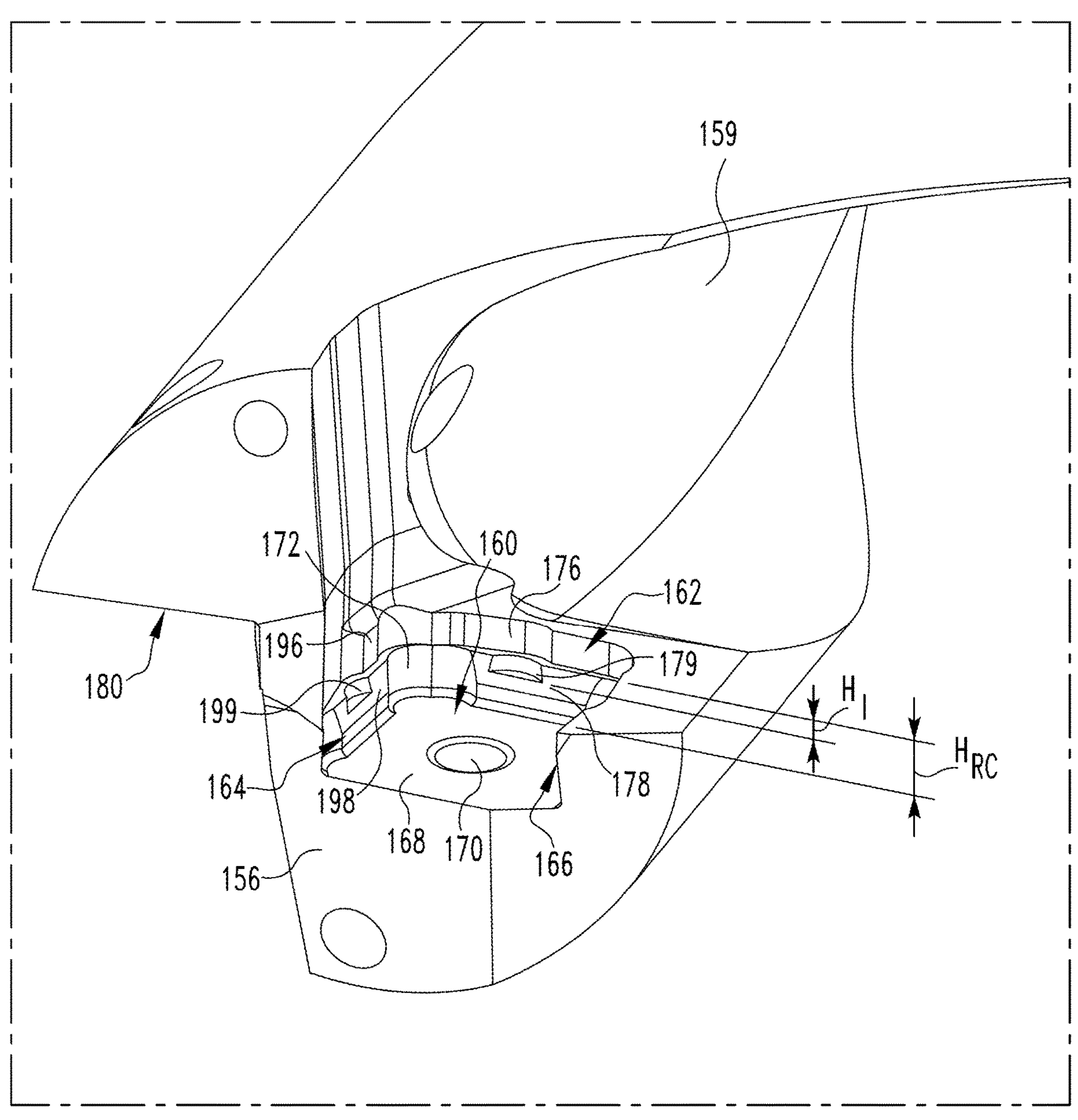
FIG. 13 is a close-up view of the end of the drilling body of FIG. 1 without a peripheral insert or drilling insert.

As shown in FIG. 13, the interior pocket 160 includes a pocket rear surface 162, a first sidewall portion 164 extending generally perpendicularly forward from the rear surface 162, and a second sidewall portion 166 extending generally from the pocket rear surface 162. The interior pocket 160 may be square or any other suitable shape of insert pocket, e.g., rectangular, triangular or the like.

As shown in FIGS. 13, the pocket rear surface 162 may be structured and arranged to engage with a first side surface 16 of the drilling insert 10, the first sidewall portion 164 may be structured and arranged to engage a second side surface 16 of the drilling insert 10, and the second sidewall portion 166 may be structured and arranged to accommodate a third side surface 16 of the drilling insert 10. As used herein, the terms "engage", "engages", and "engagement" and "engaging" mean that two or more features interact with each other to restrict relative movement between the drilling insert 10 and the interior pocket 160.

In some non-limiting embodiments or aspects, the interior pocket 160 may include a bottom seating surface 168 perpendicular to the pocket rear surface 162 and the first and second sidewall portions 164 and 166. The bottom seating surface 168 may be configured to engage the rear face 14 of the drilling insert 10. As shown in FIGS. 9-13, the bottom seating surface 168 includes a threaded mounting hole 170 that may be structured and arranged to receive a mechanical fastener 190 to secure the drilling insert 10 in the interior pocket 160.

As shown in FIGS. 9-13, the interior pocket 160 may include recessed channels 172 in the corners between the pocket rear surface 162 and the first and second sidewall portions 164 and 166. The recessed channels 172 provide a clearance for the interior pocket 160 to receive the drilling insert 10. In some non-limiting embodiments or aspects, the pocket rear surface 162 may include a rear surface upper portion 176 and a rear contact surface 178. The upper portion 176 may be structured and arranged to follow the contour of the cutting edge 20 of the drilling insert 10 such that a gap 174 exists between the cutting edge 20 and the upper portion 176 when the drilling insert 10 is secured in the interior pocket 160.

The rear contact surface 178 may be offset from the rear surface upper portion 176 and be structured and arranged to engage the seating surface 50 of the side face 16 of the cutting insert 10 when the cutting insert 10 is secured in the interior pocket 160. The height of the rear contact surface $H_{RC}$ may be measured as the vertical distance between the bottom seating surface 168 and the top of the rear contact surface 178. The rear contact height $H_{RC}$ may be at least 55% of the total height $H_T$, for example, at least 65% of the total height $H_T$ or 75% of the total height $H_T$. The rear contact height $H_{RC}$ may range from 55% to 75% of the total height $H_T$, for example, from 58% to 72% of the total height $H_T$ or from 61% to 69% of the total height.

When secured in the interior pocket 160, the seating surface 50 of the cutting insert 10 may have a contact height $H_C$ measured as the distance between the front face 12 and the contact line 45. The contact line 45 is the line which aligns with the top of the rear contact surface 178 when the cutting insert 10 is secured in the interior pocket 160. The contact height $H_C$ may be at least 25% of the total height $H_T$, for example, at least 28% of the total height $H_T$ or 31% of the total height $H_T$. The contact height $H_C$ may be at most 45% of the total height, or at most 42% of the total height. or at most 39% of the total height. The contact height $H_C$ may range from 25% to 45% of the total height $H_T$, for example, from 28% to 42% of the total height $H_T$ or from 31% to 39% of the total height.

The rear contact surface 178 may include a rear indent 179 structured and arranged to align with the lip support 74 of the side face 16 when the drilling insert 10 is secured in the interior pocket 160. The rear indent 179 may be elliptical or circular in shape. The rear indent 179 may have an indent depth $D_I$ that is equal to or greater than the maximum support depth $D_{S\text{-}Max}$. The indent depth $D_I$ may be more than $D_{S\text{-}max}$ by a range of 0.1 mm to 0.5 mm, for example, 0.15 mm to 0.4 mm or 0.2 mm to 0.3 mm.

The rear indent 179 may be structured and arranged to minimize contact between the lip support 74 and the interior pocket 160. The rear indent 179 may extend from the top of the rear contact surface 178 towards the bottom seating surface 168. The indent height $H_I$ may be equal to or less than the support height $H_S$. The indent height $H_I$ may be less than the rear contact height $H_{RC}$ of the rear contact surface 178. The rear indent 179 may be structured and arranged to allow a gap around the lip support 74 when the drilling insert 10 is secured in the interior pocket 160.

In some non-limiting embodiments or aspects, the first side wall portion 164 may include a first side upper portion 196 and a first side contact surface 198. The first side upper portion 196 may be structured and arranged to follow the contour of the cutting edge 20 of the drilling insert 10 such that a gap 174 exists between the cutting edge 20 and the first side upper portion 196 when the drilling insert 10 is secured in the interior pocket 160.

The first side contact surface 198 may be offset from the first side upper portion 196 and be structured and arranged to engage the seating surface 50 of the side face 16 of the cutting insert 10 when the cutting insert 10 is secured in the interior pocket 160. The first side contact surface 198 may include a first side indent 199 structured and arranged to align with the lip support 74 of the side face 16 when the drilling insert 10 is secured in the interior pocket 160. The first side indent 199 may be elliptical or circular in shape. The first side indent 199 may be structured and arranged to minimize contact between the lip support 74 and the interior pocket 160. The first side indent 199 may extend from the top of the first side contact surface 198 towards the bottom seating surface 168. The first side indent 199 may have the same indent height $H_I$ and/or same indent depth $D_I$ as the rear indent 179. The indent height $H_I$ may be equal to or less than the support height $H_S$. The indent height $H_I$ may be less than the height of the first side contact surface 198. The first side indent 199 may have a depth that is equal to or greater than the maximum support depth $D_{S\text{-}Max}$. The first side indent 199 may be structured and arranged to allow a gap around the lip support 74 when the drilling insert 10 is secured in the interior pocket 160.

The side surfaces 16 contacting the pocket rear surface 162 and the first sidewall portion 164 may experience the most force during drilling operations. In non-limiting embodiments or aspects, when the drilling insert 10 is mounted in the insert pocket 160 only the seating surface 50 may contact the first sidewall portion 164. In accordance with an embodiment of the present invention, any suitable size or shape of insert pocket 160 may be used to engage any shape or size of indexable drilling insert 10.

In non-limiting embodiments or aspects, the interior pocket 160 and the drilling insert 10 may be structured and arranged to allow the convex surface 35C of the second cutting edge segment 24 to make first contact with a work piece. The positioning of the drilling insert 10 in the interior pocket 160 of the drilling body 150, and the angles and orientation of the first side surface 32 and the third side surface 36 and the convex surface 35C directs the cutting forces toward the longitudinal rotational axis 154 of the drilling body 150. Directing the forces toward the longitudinal rotational axis 154 of the drilling body 150 balances the cutting forces that the drilling body 150 experiences during the drilling process and thus keeps the drilling tool system 100 from drifting away from the center. While cutting, the drilling body 150 may rotate in a counterclockwise around the longitudinal rotational axis when facing the front drilling face 156.

The drilling body 150 may be made of any suitable material, such as steel, stainless steel or any other material having sufficient strength. The drilling body 150 of the present invention may be fabricated by any suitable technique, such as machining to provide the insert pockets and flutes.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

For purposes of the description above, it is to be understood that the invention may assume various alternative variations and step sequences except where expressly specified to the contrary. Moreover, all numbers expressing, for example, quantities of ingredients used in the specification and claims, are to be understood as being modified in all instances by the term "about". Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a," "an," and "the" include plural referents unless expressly and unequivocally limited to one referent.

In this application, the use of "horizontal", "vertical", "positive" and "negative" are used as relative terms and it is understood that during use the drilling body and the drilling insert may have different orientations.

Whereas particular embodiments of this invention have been described above for purposes of illustration, it will be evident to those skilled in the art that numerous variations of the details of the present invention may be made without departing from the invention as defined in the appended claims.

What is claimed is:

1. A cutting insert comprising:

a front face;

a rear face;

a plurality of side faces adjoining the front face and the rear face, wherein each side face comprises a seating surface;

a cutting edge formed at the intersection of each side face and the front face;

a cutting lip extending rearwardly from the cutting edge, the cutting lip overhanging the seating surface; and a top transition edge connecting the seating surface and the cutting lip, wherein the top transition edge comprises a lip support extending rearwardly from the cutting lip to the seating surface, and wherein a width of the lip support decreases rearwardly from the cutting lip to the seating surface.

2. The cutting insert of claim 1, wherein the 1p transition edge comprises a first chamfer separated from a second chamfer adjacent the lip support.

3. The cutting insert of claim 1, wherein a support angle As of the support lip is from 25 to 45° as measured from an axis parallel to a central, longitudinal axis.

4. The cutting insert of claim 1, wherein the lip support comprises a lip support depth Ds that extends at most 5% of a total width of the cutting insert $W_{CI}$ from the seating surface, wherein the total width of the cutting insert $W_{CI}$ is measured as the distance from the cutting edge to a second cutting edge of an opposite side face.

5. The cutting insert of claim 1, wherein the cutting edge further comprises a concave curve and a linear edge.

6. The cutting insert of claim 1, wherein the lip support comprises a support height Hs that is at least 35% of a total height $H_T$ of the cutting insert, wherein the total height $H_T$ is measured as a distance between the front face and the rear face.

7. The cutting insert of claim 1, wherein the lip support is centered at least 60% along a side length $L_{Side}$ of the side face.

8. The cutting insert of claim 1, wherein a side height $H_{Side}$ of the seating surface is at least 70% of a total height $H_T$ of the cutting insert, wherein the total height is measured as a distance between the front face and the rear face.

9. The cutting insert of claim 1, wherein a side length $L_{Side}$ of the side face is at least 55% of a total width of the cutting insert $W_{CI}$, wherein the total width of the cutting insert $W_{CI}$ is measured as the distance from the cutting edge to a second cutting edge of an opposite side face.

10. A drilling tool system comprising:
a drilling tool; and
a cutting insert, the cutting insert being secured into the drilling tool;
wherein the drilling tool comprises:
a drilling body comprising a central longitudinal rotational axis, and an interior pocket in a front drilling face, the interior pocket comprising:
a bottom seating surface;
a pocket rear surface comprising an upper portion above a lower portion, the upper portion being offset from the lower portion; and
a first sidewall portion extending forward from the pocket rear surface:
wherein the lower portion comprises a rearwardly extending indent with an indent height being less than a lower portion height; and
wherein the cutting insert comprises:
a front face;
a rear face;
a plurality of side faces adjoining the front face and the rear face, wherein each side face comprises a seating surface;
a cutting edge formed at the intersection of each side face and the front face;
a cutting lip extending rearwardly from the cutting edge, the cutting lip extending radially outward from the seating surface; and
a top transition edge connecting the seating surface and the cutting lip,
wherein the top transition edge comprises a lip support extending rearwardly from the cutting lip to the seating surface, and
wherein a width of the lip support decreases rearwardly from the cutting lip to the seating surface.

11. The drilling tool system of claim 10, wherein the indent aligns with the lip support.

12. The drilling tool system of claim 10, wherein the lower portion aligns with the seating surface.

13. The drilling tool system of claim 10, wherein the top transition edge comprises a first chamfer separated from a second chamfer the lip support.

14. The drilling tool system of claim 10, wherein a support angle As of the support lip is from 25 to 45° as measured from an axis parallel to a central, longitudinal axis.

15. The drilling tool system of claim 10, wherein the lip support comprises a lip support depth Ds that extends at most 5% of a total width of the cutting insert $W_{CI}$ from the seating surface, wherein the total width of the cutting insert $W_{CI}$ is measured as the distance from the cutting edge to a second cutting edge of an opposite side face.

16. The drilling tool system of claim 10, wherein the cutting edge further comprises a concave curve and a linear edge.

17. The drilling tool system of claim 10, wherein the lip support comprises a support height Hs that is at least 35% of a total height $H_T$ of the cutting insert, wherein the total height $H_T$ is measured as a distance between the front face and the rear face.

18. The drilling tool system of claim 10, wherein the lip support is centered at least 60% along a side length $L_{Side}$ of the side face.

19. The drilling tool system of claim 10, wherein a side height $H_{Side}$ of the seating surface is at least 70% of a total height $H_T$ of the cutting insert, wherein the total height $H_T$ is measured as a distance between the front face and the rear face.

20. The drilling tool system of claim 10, wherein a side length $L_{Side}$ of the side face is at least 55% of a total width of the cutting insert $W_{CI}$, wherein the total width of the cutting insert $W_{CI}$ is measured as the distance from the cutting edge to a second cutting edge of an opposite side face.

* * * * *